United States Patent
Chen et al.

(10) Patent No.: US 10,649,278 B2
(45) Date of Patent: May 12, 2020

(54) SUSTRATE COMPRISING QUANTUM ROD FILM AND METHOD FOR MANUFACTURING THE SAME, DISPLAY PANEL

(71) Applicant: Shenzhen China Star Optoelectronics Technology Co., Ltd., Shenzhen, Guangdong (CN)

(72) Inventors: Xingwu Chen, Guangdong (CN); Dongze Li, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 255 days.

(21) Appl. No.: 15/550,135

(22) PCT Filed: Jul. 4, 2017

(86) PCT No.: PCT/CN2017/091663
§ 371 (c)(1),
(2) Date: Jan. 9, 2018

(87) PCT Pub. No.: WO2018/223472
PCT Pub. Date: Dec. 13, 2018

(65) Prior Publication Data
US 2020/0004081 A1 Jan. 2, 2020

(30) Foreign Application Priority Data
Jun. 7, 2017 (CN) .......................... 2017 1 0423427

(51) Int. Cl.
*G02F 1/1335* (2006.01)
*G02F 1/13357* (2006.01)

(52) U.S. Cl.
CPC .. *G02F 1/133617* (2013.01); *G02F 1/133514* (2013.01); *G02F 2202/36* (2013.01)

(58) Field of Classification Search
CPC ......... G02F 1/133514; G02F 1/133617; G02F 2202/36; G02F 1/133603; G02F 1/1335;
(Continued)

(56) References Cited

U.S. PATENT DOCUMENTS

2011/0181819 A1* 7/2011 Kang ................ G02F 1/133516
349/110
2014/0204319 A1* 7/2014 Cai ................... G02F 1/133514
349/106
(Continued)

FOREIGN PATENT DOCUMENTS

CN 101376599 A 3/2009
CN 101398561 A 4/2009
(Continued)

*Primary Examiner* — Shan Liu

(57) ABSTRACT

Disclosed are a substrate including a quantum rod film, a method for manufacturing the substrate including the quantum rod film, and a display panel. Quantum rod assemblies included in the quantum rod film are arranged sequentially on the substrate, and meanwhile lights of different wavelengths can be obtained by adjusting sizes of the quantum rod assemblies. The quantum rod film disclosed corresponds to a combination of a polarizing layer and a color filter layer in the prior art. Thus, a thickness of the display panel can be reduced, and meanwhile production costs can be reduced. Besides, since quantum rods have high light conversion efficiency, a light utilization rate can be improved to enable the display panel to have a high color gamut and a high luminance.

18 Claims, 5 Drawing Sheets

(58) Field of Classification Search
CPC ..... G02F 2001/133614; G02F 2201/44; G02F 1/116; G02F 1/133509; G02F 1/216; G02F 2001/133521; G02F 1/133512; G02F 1/136209; G02F 1/13473; G02F 1/133371; G02F 2001/136222; G02F 2001/136218; G02B 5/0294; G02B 6/3532; G03G 15/0435; H01J 9/205; H01J 11/44; H01J 2211/444; H01J 2329/323; H01J 29/327
USPC ................................ 349/69–71, 84, 104–111
See application file for complete search history.

(56) References Cited

U.S. PATENT DOCUMENTS

| | | | | |
|---|---|---|---|---|
| 2016/0320664 A1* | 11/2016 | Kang | ................ | G02F 1/133528 |
| 2017/0102588 A1* | 4/2017 | Im | .................... | G02F 1/133514 |
| 2018/0011372 A1* | 1/2018 | Yang | ................... | G02B 5/3025 |

FOREIGN PATENT DOCUMENTS

| | | | |
|---|---|---|---|
| CN | 102502485 | A | 6/2012 |
| CN | 102664237 | A | 9/2012 |
| CN | 103854723 | A | 6/2014 |
| CN | 104992631 | A | 10/2015 |
| CN | 105152125 | A | 12/2015 |
| JP | 2010085337 | A | 4/2010 |

* cited by examiner

SUSTRATE COMPRISING QUANTUM ROD FILM AND METHOD FOR MANUFACTURING THE SAME, DISPLAY PANEL

CROSS-REFERENCE TO RELATED APPLICATIONS

This application claims the priority of Chinese patent application CN CN201710423427.6, entitled "Substrate comprising quantum rod film and method for manufacturing the same, display panel" and filed on Jun. 7, 2017, the entirety of which is incorporated herein by reference.

FIELD OF THE INVENTION

The present disclosure relates to the technical field of display, and in particular, to a substrate comprising a quantum rod film, a method for manufacturing the substrate comprising a quantum rod film, and a display panel.

BACKGROUND OF THE INVENTION

With rapid development of display technology, liquid crystal display has become one of the most widely used display technologies at present, and requirements of people on display technologies become higher and higher. Thus, lightness, thinness, a high color gamut, and a high luminance become an important development direction of display technologies at present.

In the prior art, a display panel generally comprises a first substrate, a second substrate opposite to the first substrate, and a liquid crystal layer arranged between the first substrate and the second substrate. Further, a first polarizing plate and a second polarizing plate are respectively arranged at a surface of the first substrate and a surface of the second substrate far away from the liquid crystal layer, and the first substrate or the second substrate further comprises a color filter layer. Color of lights emitted from a liquid crystal panel is determined by the color filter layer and deflection results of liquid crystals so as to achieve image display. With the development of the display technology, requirements on thickness, color gamut, and luminance of the display panel become higher and higher. Thus, a lighter and thinner display panel with the high color gamut and the high luminance, in relation to the prior art, becomes a direction of research and development of many producers.

Quantum dots, also referred to as micrometer-crystals, comprise micrometer particles having diameters in a range from 1 nm to 20 nm. Since electrons and holes are affected by a quantum confinement effect, continuous energy band structures of the quantum dots are divided into separate energy level structures, and the quantum dots can emit fluorescence after being excited. An emission spectrum of the quantum dots is mainly controlled by particle diameters of the quantum dots, and thus an adjustment of the emission spectrum of the quantum dots can be achieved by changing the particle diameters of the quantum dots. Meanwhile, light conversion efficiency of the quantum dots are high, and a light utilization rate can be improved. Quantum rods are a two-dimensional micrometer material, and have a light adjustment effect of the quantum dots. That is, a spectrum obtained when the quantum rods is excited can be changed by adjusting sizes of the quantum rods. Moreover, sequentially arranged quantum rods can also achieve polarization of light. However, it has been a problem about how to achieve a sequential arrangement of the quantum rods so as to achieve the polarization of light.

SUMMARY OF THE INVENTION

In order to solve the problem in the prior art, the present disclosure provides a substrate comprising a quantum rod film, a method for manufacturing the substrate comprising a quantum rod film, and a display panel.

First, the present disclosure provides a method for manufacturing a substrate comprising a quantum rod film, which comprises following steps.

S10: A first film is formed on a first base.

S20: The first film formed in S10 is treated to form a plurality of first areas which are arranged with gaps therebetween and are strip-shape structures with micrometer-scale widths. Other areas on the first film are second areas. The first areas and the second areas have opposite hydrophilicity and hydrophobicity.

S30: A solution comprising quantum rod assemblies is coated onto the first film obtained in S20 to form a quantum rod sub-film. The quantum rod assemblies and the first areas have same hydrophilicity and hydrophobicity. The quantum rod assemblies have micrometer-scale sizes, and are arranged sequentially in the first areas.

S40: An adhesive is coated on the quantum rod sub-film, and a second base is attached to the adhesive.

S50: The first base is peeled off, and a first quantum rod sub-film is transferred to the second base.

S60: S10 to S40 are repeated at least once on the first quantum rod sub-film to form at least two quantum rod sub-films on the second base.

The quantum rod film comprises all the quantum rod sub-films. Orthographic projections of the first areas for making different quantum rod sub-films on the second base do not overlap, and all the orthographic projections of the first areas on the second base cover a surface of the second base entirely.

In the present disclosure, the first areas are arranged to be strip-shape structures with micrometer-scale widths, and meanwhile the first areas and the quantum rod assemblies are arranged to have same hydrophilicity and hydrophobicity. The quantum rod assemblies are arranged sequentially in the first areas by means of an inductive effect of the first areas so as to obtain the quantum rod film and meanwhile obtain effects of a color filter layer and a polarizing layer. Thus, the substrate manufactured with the method can be thinner. Moreover, a display panel comprising the substrate can be lighter and thinner and have a higher color gamut and a higher luminance.

As a further improvement to the above, the first film is a hydrophilic film. The first areas are hydrophobic areas with widths in a range from 1 μm to 20 μm. The quantum rod assemblies are hydrophobic with sizes in a range from 0.5 μm to 20 μm.

As a further improvement to the above method, the first film is a hydrophobic film, the first areas are hydrophilic areas with widths in a range from 1 μm to 20 μm, and the quantum rod assemblies are hydrophilic with sizes in a range from 0.5 μm to 20 μm.

In the present disclosure, the range of the widths of the first areas is a preferred range. In this range, quantum rod assemblies of different sizes can be held, and thus the quantum rod film can emit lights of different wavelengths according to actual needs.

As a further improvement to the above method, in S10, the first film is formed by polydimethylsiloxane. In S20, an ultraviolet irradiation, an ozone treatment or a plasma treatment is performed to local areas of the first film to enable alkyl chain in treated areas to produce hydroxyl so as to form the first areas. A process for manufacturing the first areas becomes simpler and more convenient by using polydimethylsiloxane as a material for forming the first film. The ultraviolet irradiation, the ozone treatment and the plasma treatment are common techniques in the art. Thus, effects of the present disclosure can be achieved by using existing equipment, which reduces production, research and development costs.

As a further improvement to the above method, in S40, before the adhesive is coated, passivation is performed to the first areas with hexamethyldisilazane to enable hydroxyl in the first areas to be replaced by methyl. Surface energy of the first areas is reduced by the passivation performed to the first areas before coating the adhesive, so that an attaching effect between the adhesive and the quantum rod sub-film is better.

As a further improvement to the above method, the plurality of the first areas is arranged in parallel. The first areas are arranged in parallel so that a polarizing effect of the quantum rod film is better.

As a further improvement to the above method, in S30, the solution comprising the quantum rod assemblies is coated by spin coating, slot coating, or ink jet printing.

The present disclosure further provides a substrate comprising a quantum rod film, and the substrate is manufactured according to the above method.

Preferably, the substrate is a color filter substrate. The substrate comprising the quantum rod film as the color filter substrate has an advantage that a structure of the color filter substrate is simpler than an array substrate. Thus, a process is much simpler by arranging the quantum rod film onto the color filter substrate.

Besides, the present disclosure further provides a display panel. The display panel comprises a first substrate, a second substrate opposite the first substrate, and a liquid crystal layer arranged between the first substrate and the second substrate. The first substrate is the substrate comprising the quantum rod film described above, and a polarizing layer is arranged at a side of the second substrate far away from the liquid crystal layer.

According to the substrate comprising a quantum rod film, the method for manufacturing the substrate comprising a quantum rod film, and the display panel provided by the present disclosure, quantum rods are sequentially arranged on the substrate. Meanwhile, the lights of different wavelengths can be obtained by adjusting the sizes of the quantum rod assemblies. The quantum rod film in the present disclosure corresponds to a combination of a polarizing layer and a color filter layer in the prior art. Thus, a thickness of the display panel can be reduced, and meanwhile production costs can be reduced. Besides, since quantum rods have high light conversion efficiency, a light utilization rate can be improved to enable the display panel to have a high color gamut and a high luminance.

BRIEF DESCRIPTION OF THE DRAWINGS

The present disclosure is described in a more detailed way below based on embodiments and with reference to the accompanying drawings. In the drawings.

In the accompanying drawings, same components are represented by same reference signs. The accompanying drawings are not drawn according to actual proportions.

DETAILED DESCRIPTION OF THE EMBODIMENTS

The present disclosure is described in detail below with reference to the accompanying drawings. In the following text, the terms, such as "top", "bottom", "left" and "right" refer to directions in relation to the drawings, and they should not be understood as restrictions to the present disclosure. The symbol "μm" used in the present disclosure refers to micrometer which is a length unit, and the symbol "nm" refers to nanometer which is also a length unit.

The main purpose of the present disclosure is to provide a method for arranging quantum rods sequentially on a substrate with respect to an application of the quantum rods in a display panel. A film layer is formed on a baseplate, and areas having different hydrophilicity and hydrophobicity are arranged on the film layer. Areas on the film layer, which have same hydrophilicity and hydrophobicity as quantum rod assemblies, are arranged to be slot structures. The quantum rod assemblies, surfaces of which are modified, are induced to arrange sequentially by means of a difference in hydrophilicity and hydrophobicity of a film surface and a slot effect. A quantum rod film comprising the quantum rod assemblies sequentially arranged is formed on a surface of the baseplate, and then the quantum rod film is transferred to any substrate surface by means of a transfer technique so as to form a substrate comprising the quantum rod film. The quantum rod assemblies sequentially arranged can achieve polarization of light, and lights of different wavelengths can be obtained by adjusting sizes of the quantum rod assemblies. Thus, a combination of a polarizing layer and a color filter layer in the prior art is achieved by the substrate comprising the quantum rod film. Accordingly, a thickness of the display panel can be reduced, and meanwhile production costs can be reduced. Besides, since quantum rods have high light conversion efficiency, a light utilization rate can be improved to enable the display panel to have a high color gamut and a high luminance.

Figure 1:
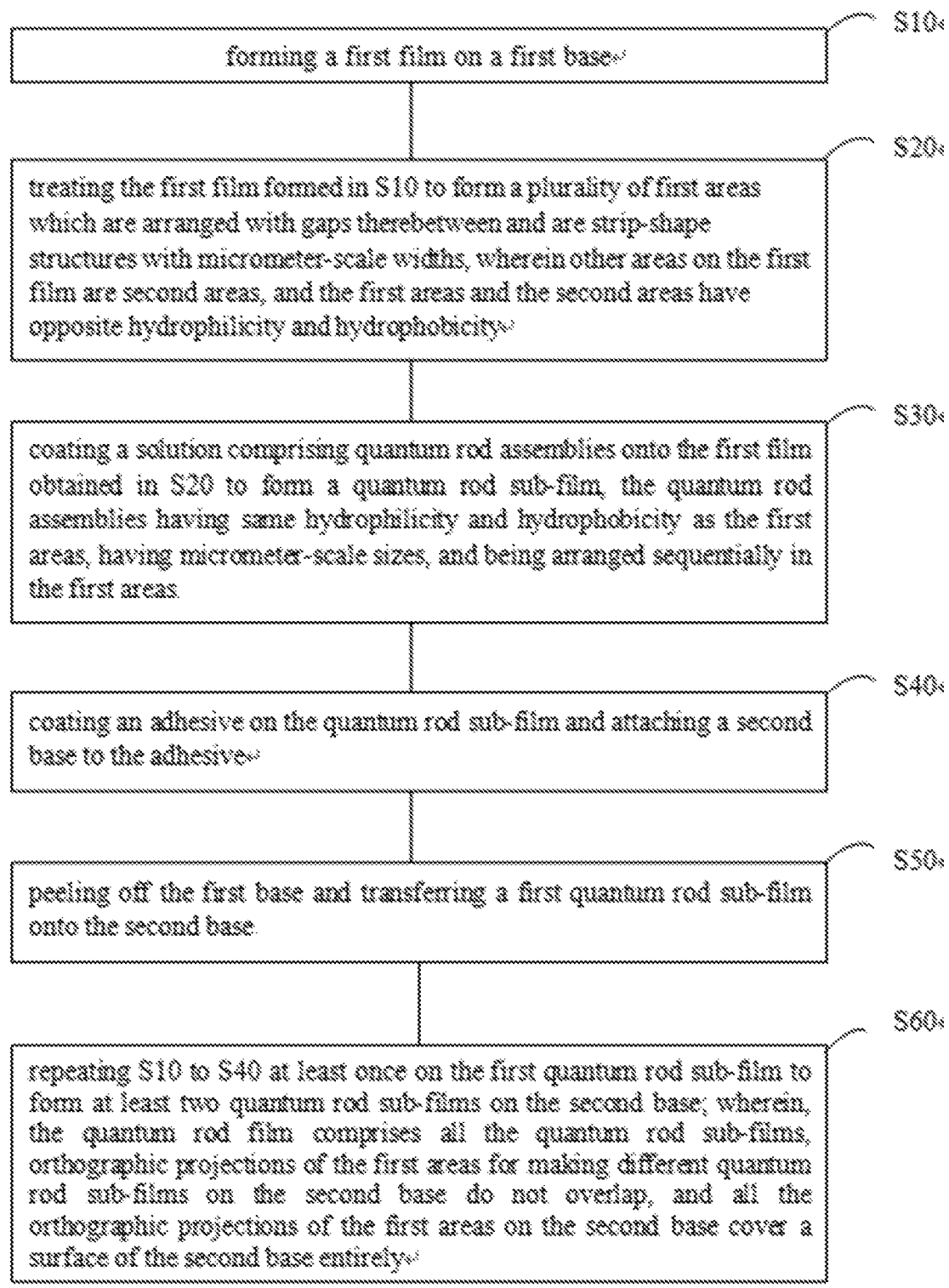
FIG. 1 is a flow chart showing a method for manufacturing a substrate comprising a quantum rod film.

FIG. 1 is a flow chart showing a method for manufacturing the substrate comprising the quantum rod film in the present embodiment. The method comprises the following steps.

S10: A first film is formed on a first base.

S20: The first film in step S10 is treated to form a plurality of first areas, which are arranged with gaps therebetween and are strip-shape structures with micrometer-scale widths. Other areas on the first film are second areas. The first areas and the second areas have opposite hydrophilicity and hydrophobicity.

S30: A solution comprising the quantum rod assemblies is coated onto the first film formed in step S20 to form a quantum rod sub-film. The quantum rod assemblies and the first areas have same hydrophilicity and hydrophobicity. The quantum rod assemblies have micrometer-scale sizes, and are arranged sequentially in the first areas.

S40: An adhesive is coated on the quantum rod sub-film, and a second base is attached to the adhesive.

S50: The first base is peeled off, and a first quantum rod sub-film is transferred to the second base.

S60: Steps S10 to S40 are repeated at least once on the first quantum rod sub-film to form at least two quantum rod sub-films on the second base.

The quantum rod film comprises all the quantum rod sub-films. Orthographic projections of the first areas for making different quantum rod sub-films on the second base do not overlap, and all the orthographic projections of the first areas on the second base cover a surface of the second base entirely.

The above steps are described in detail below in combination with specific figures and examples.

Figure 2:
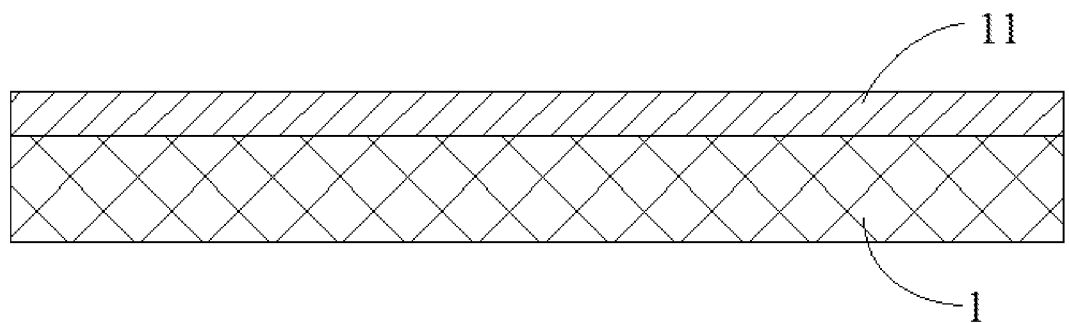
FIG. 2 schematically shows a structure of a first film formed in the embodiments of the present disclosure.

As shown in FIG. 2, in step S10, a first film 11 is formed on a first base 1. In the present embodiment, the first film is a hydrophobic film. This means that the film has a hydrophobic property. The hydrophobic film is formed by coating a hydrophobic material on the first base to form a film, or by other film formation manners. Specifically, polydimethylsiloxane can be used as the hydrophobic material for forming the hydrophobic film. The first film can also be a hydrophilic film made from a hydrophilic material. In this circumstance, corresponding changes should be made to other portions so as to achieve the purpose of the present disclosure. For example, the first areas formed in step S20 are hydrophobic, and the quantum rod assemblies should also be hydrophobic. A method for controlling the hydrophilicity and hydrophobicity of the quantum rod assemblies can be easily obtained in the prior art, and it is not described here to avoid redundancy.

Figure 3:
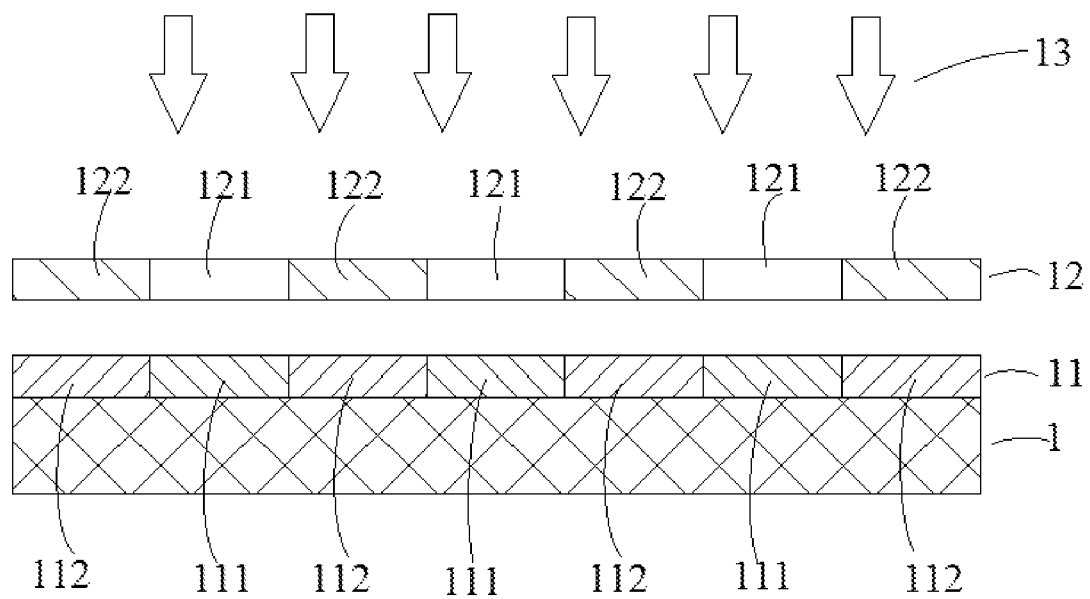
FIG. 3 schematically shows a structure of first areas formed in the embodiments of the present disclosure.

As shown in FIG. 3, in step S20, the first film 11 formed in step S10 is treated to form a plurality of first areas 111 arranged with gaps therebetween. The first areas 111 are strip-shape structures with micrometer-scale widths. Other areas on the first film 11 are second areas 112. The first areas 111 and the second areas 112 have opposite hydrophilicity and hydrophobicity. In the present embodiment, as shown in FIG. 2, a mask 12 is arranged at a position corresponding to the first film 11 on the first base 1.

Non-blocking portions 121 and blocking portions 122 are arranged on the mask. When the first film is irradiated by ultraviolet rays 13, the non-blocking portions 121 permit the ultraviolet rays to transmit, but the blocking portions 122 prevent the ultraviolet rays from transmitting. In this way, areas on the first film 11 corresponding to the non-blocking portions 121 form the first areas 111. (That is, positions corresponding to the first areas 111 on the first film 11 are changed into hydrophilic areas, and other manners can also be used. For example, the positions corresponding to the first areas 111 on the first film 11 are bombarded with ozone or plasma, so that C—H groups on surfaces of the first areas are replaced by C—OH groups. Thus, the surfaces of the first areas become hydrophilic, i.e., the first areas are changed into hydrophilic areas.) Positions corresponding to the blocking portions 122 on the first film 11 are not irradiated by the ultraviolet rays, and the second areas which are not irradiated keep the original hydrophobicity. Preferably, the first areas 11 have widths ranging from 1 μm to 20 μm.

Figure 4:
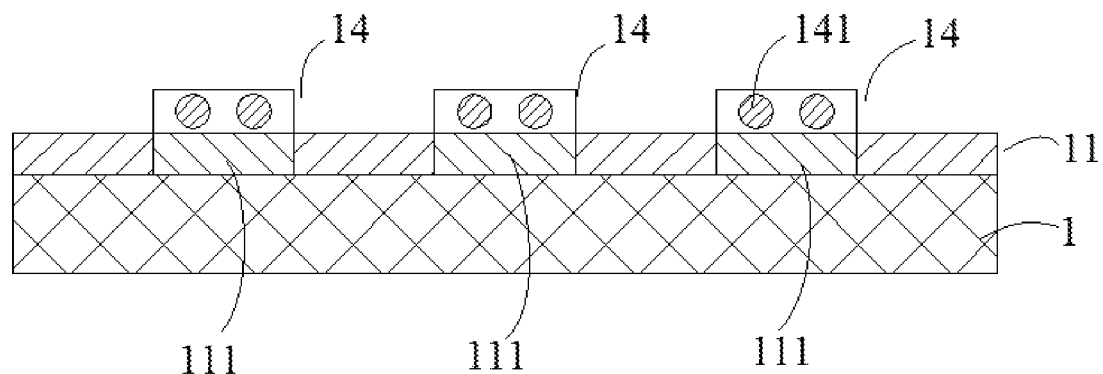
FIG. 4 schematically shows a structure of a quantum rod sub-film formed in the embodiments of the present disclosure.
Figure 5:
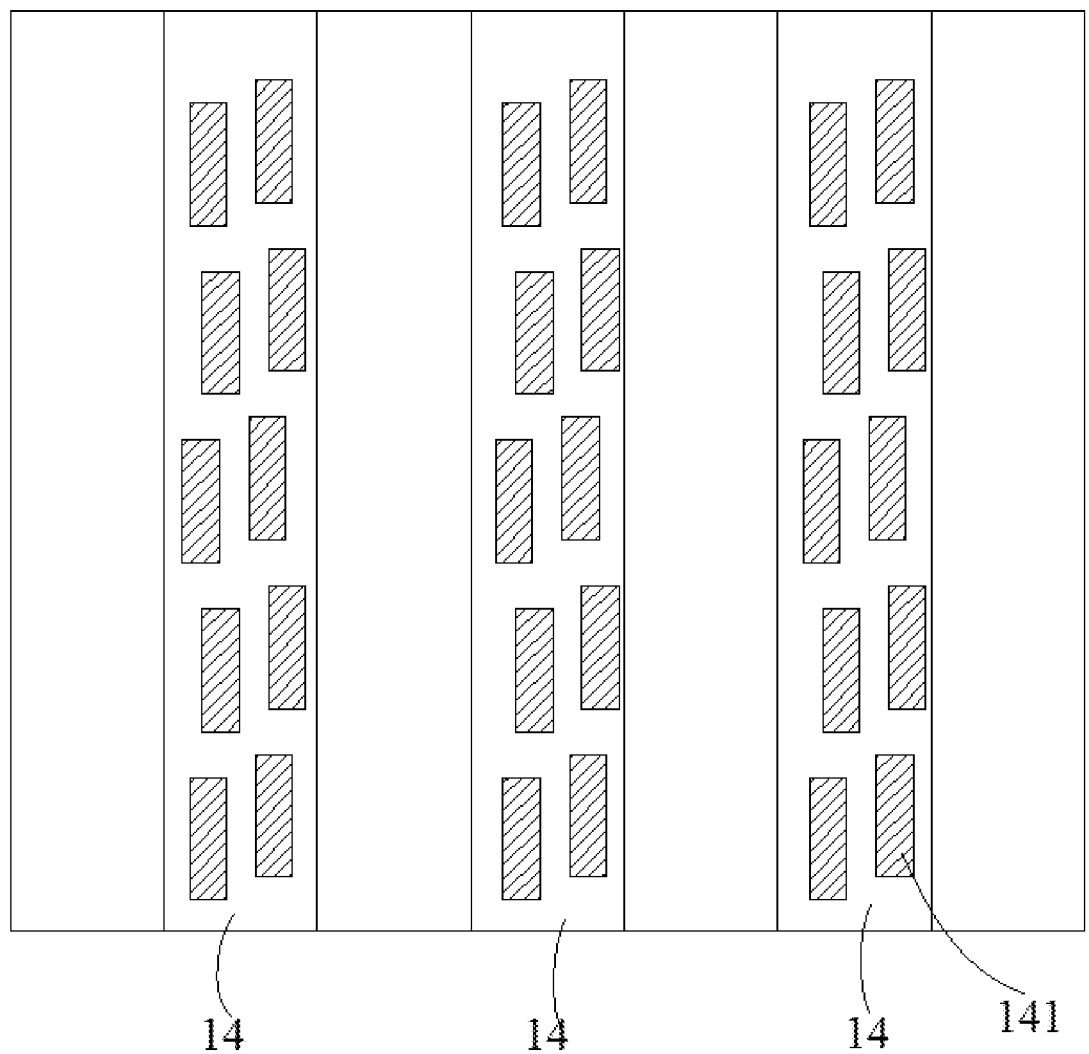
FIG. 5 schematically shows a top view of the structure in FIG. 4.

As shown in FIG. 4, in step S30, the solution comprising the quantum rod assemblies is coated onto the first film 11 obtained in step S20 to form a quantum rod sub-film 14. The quantum rod assemblies and the first areas 111 have same hydrophilicity and hydrophobicity. As shown in FIG. 4, quantum rod assemblies 141 in the quantum rod sub-film are sequentially arranged at the positions corresponding to the first areas 111. Since the quantum rod assemblies and the first areas have same hydrophilicity and hydrophobicity, the quantum rod assemblies can gather on upper sides of the first areas 111 when the solution comprising the quantum rod assemblies is coated onto the first film 11. Further, since the first areas 111 have micrometer-scale widths, i.e., the first areas 111 correspond to micrometer-scale slots, an inductive effect of the slots can cause the quantum rod assemblies to sequentially arrange on the upper sides of the first areas. Accordingly, the quantum rod sub-film as shown in FIGS. 4 and 5 is obtained. In some embodiments, other coating manners can be selected. For example, spin coating, slot coating, or ink jet printing can be used. Preferably, the slot coating is selected.

The quantum rod assemblies 141 have rod-shape structures which have relatively big sizes in one dimension and have relatively small sizes in two other dimensions. The sizes of the quantum rod assemblies in the present disclosure refer to the sizes in the dimensions, in which the sizes are relatively small. For example, in the present disclosure, the sizes of the quantum rod assemblies 141 are micrometer-scale, which means that the sizes of the quantum rod assemblies 141 in the dimensions, in which the sizes are relatively small, are micrometer-scale. Preferably, the sizes of the quantum rod assemblies range from 0.5 μm to 20 μm.

The solution comprising the quantum rod assemblies can be prepared before using. The quantum rods used in the present embodiment are water-soluble quantum rods, and the sizes of the quantum rods are generally nanometer-scale, for example, from 1 nm to 1000 nm. The following is a method for preparing the solution comprising the quantum rod assemblies in the embodiments of the present disclosure.

(1) The quantum rods are modified so as to obtain quantum rod micelles. Specifically, the quantum rods are dissolved in an aqueous solution of glycol, and octylamine and octadecylphosphonic acid are added into the solution. The solution is well mixed. After a solvent is removed, the quantum rod micelles are obtained.

(2) The quantum rod micelles are assembled to form micrometer-scale quantum rod assemblies. Specifically, the quantum rod micelles are dissolved into chloroform, and a certain amount of dodecyltrimethylammonium bromide is added. The chloroform is removed by argon gas evaporation. Then, residue is added into glycol, and the quantum rod assemblies are formed after a ten-minute vigorous stirring. Subsequently, dithiols functionalized Tween-20 are added to stabilize the quantum rod assemblies.

(3) The solution comprising the quantum rod assemblies is prepared. Specifically, separation and purification are performed to the quantum rod assemblies formed. The quantum rod assemblies purified are dispersed in different polar solvents. The polar solvents can be water, ethanol, glycol, or a mixture thereof. There are also many other suitable polar solvents, and they are not described here to avoid redundancy.

Materials of the water-soluble quantum rods in the present disclosure can be selected from CdX, PbX, ZnX, HgX, GaX, InX (X in these molecular formulas can be S, Se or Te), and mixtures thereof, and a ligand that reacts with the above materials is a common water-soluble surface ligand (the ligand can be mercaptoacetic acid, mercaptopropionic acid, mercaptoalanine, or mercaptoundecanoic acid, glutathione and so on). Other materials of the quantum rods and the surface ligands suitable for the present disclosure can also be used in the present disclosure, and they are not described here to avoid redundancy.

Figure 6:
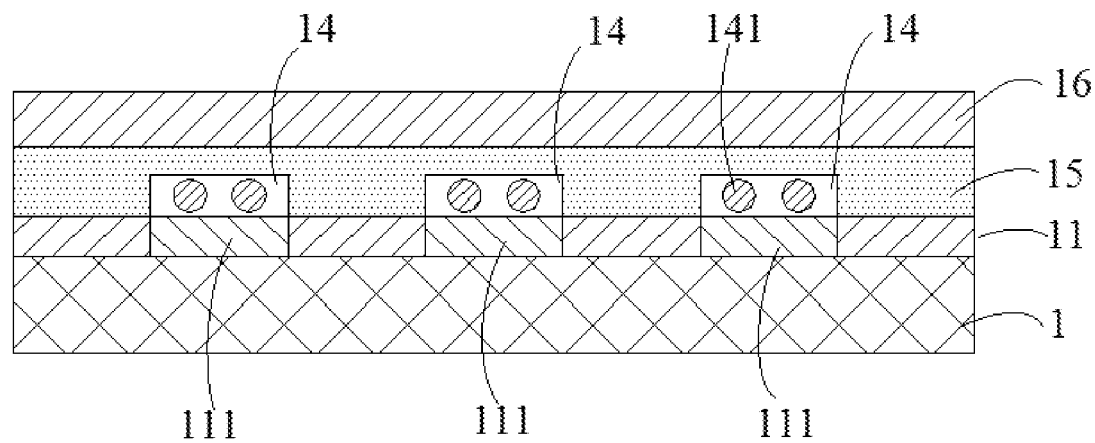
FIG. 6 schematically shows a structure when an adhesive is coated on the quantum rod sub-film in the embodiments of the present disclosure.

As shown in FIG. 6, in step S40, an adhesive 15 is coated on the quantum rod sub-film 14, and a second base 16 is attached to the adhesive. Before the adhesive 15 is coated, passivation is performed to the hydrophilic areas on the first film 11 with hexamethyldisilazane so that hydroxyl in the first areas is replaced by methyl. Surface energy of the hydrophilic areas is reduced by the passivation, which is beneficial for coating the adhesive.

The adhesive 15 can be made of a material selected from a group consisting of a urethane pressure sensitive adhesive, an acrylic acid pressure sensitive adhesive, a rubber pressure sensitive adhesive (for example, a styrene-butadiene rubber), a polyvinylether pressure sensitive adhesive, a polyisobutylene pressure sensitive adhesive, an epoxy pressure sensitive adhesive, a pressure sensitive adhesive of phenols, a silicon pressure sensitive adhesive, a polyester pressure sensitive adhesive, and mixtures thereof. Other materials of the adhesive can also be used in the present disclosure, and they are not described here to avoid redundancy.

Figure 7:
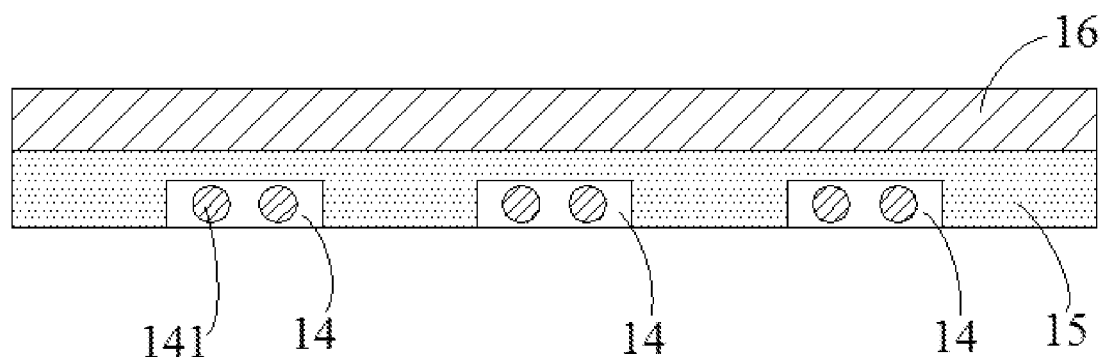
FIG. 7 schematically shows a structure when the quantum rod sub-film is transferred to a second base in the embodiments of the present disclosure.

As shown in FIG. 7, in step S50, the first base 1 is peeled off, and a first quantum rod sub-film 14 is transferred to the second base 16.

Figure 8:
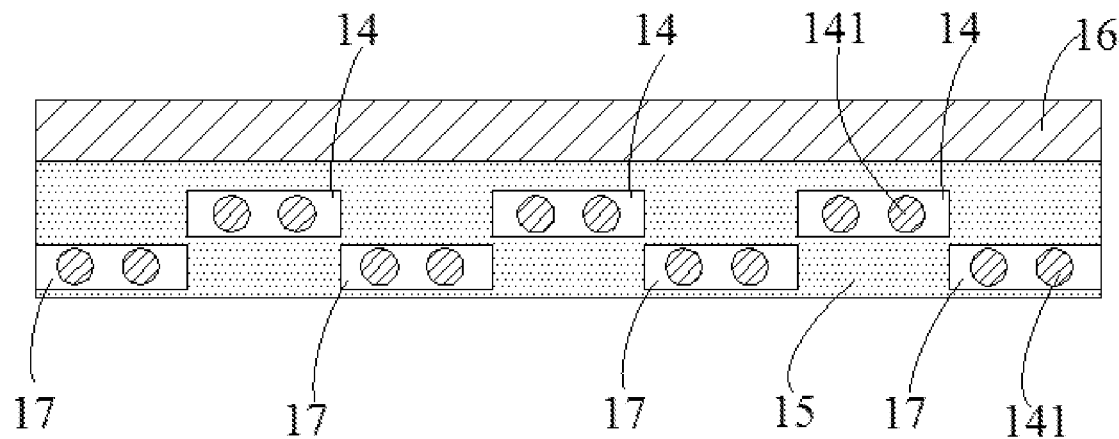
FIG. 8 schematically shows a structure when the quantum rod film is formed on the second base.

As shown in FIG. 8, in step S60, steps S10 to S40 are repeated at least once on the first quantum rod sub-film 14 to form a second quantum rod sub-film 17 on the second base 16. The quantum rod film comprises all the first quantum rod sub-film 14 and the second quantum rod sub-films 17. Orthographic projections of the first areas for making different quantum rod sub-films on the second base 16 do not overlap, and all the orthographic projections of the first areas on the second base cover a surface of the second base 16 entirely.

In the present embodiment, two quantum rod sub-films, formed on the second base 16, form the quantum rod film together, and the quantum rod assemblies in the quantum rod film are arranged sequentially.

Figure 9:
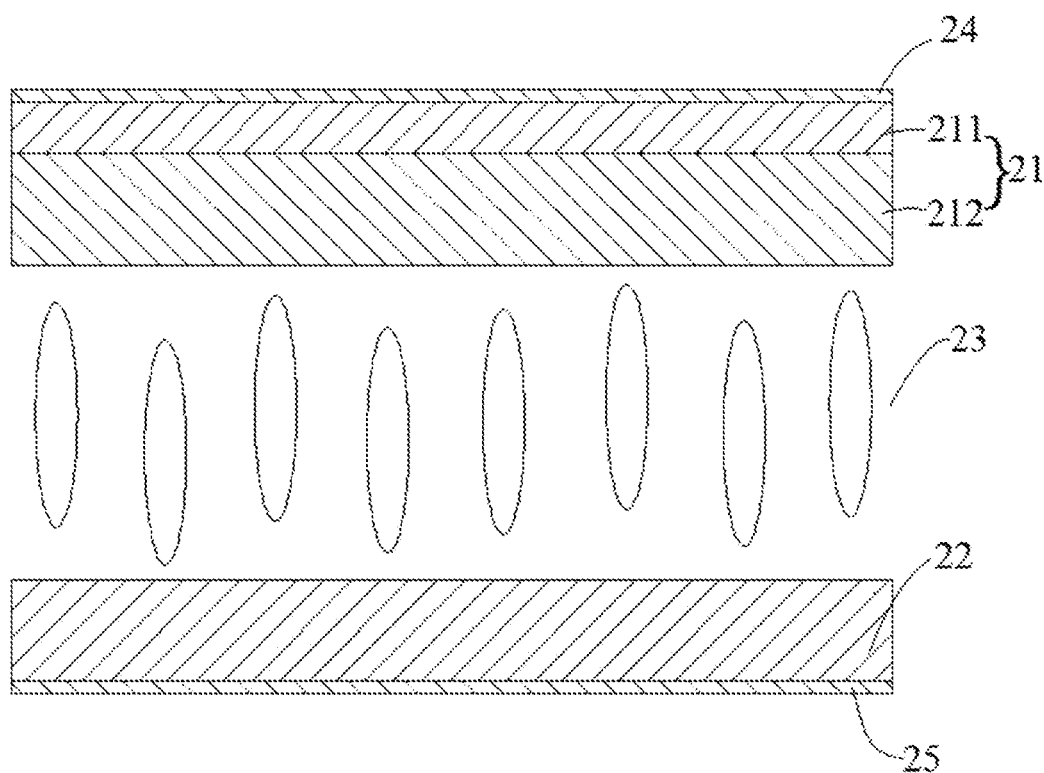
FIG. 9 schematically shows a display panel in the prior art.

FIG. 9 schematically show a structure of a display panel in the prior art. The display panel comprises a first substrate 21, a second substrate 22 opposite to the first substrate 21, and a liquid crystal layer 23 arranged between the first substrate 21 and the substrate 22. A first polarizing plate 24 and a second polarizing plate 25 are respectively arranged at a side of the first substrate 21 and a side of the second substrate 22 far away from the liquid crystal layer 23. In the structure of the display panel shows in FIG. 9, the first substrate 21 further comprises a base 211 and a color filter layer 212. In the present disclosure, specific descriptions are made only to the portions related in improvements of the present disclosure, and other portions are not described in detail. The display panel obviously further comprises other portions, for example, an alignment film layer, a plastic frame, thin film transistors and so on, which are common knowledge for those skilled in the art and are not described here to avoid redundancy.

Figure 10:
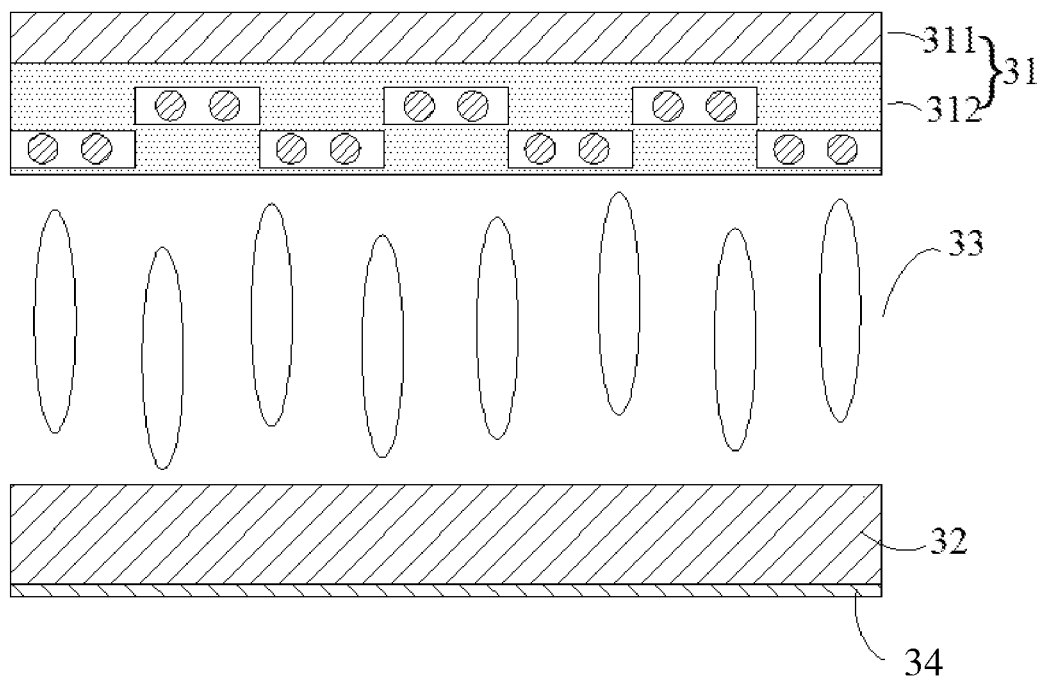
FIG. 10 schematically shows a display panel in the present disclosure.

FIG. 10 shows an embodiment of a display panel in the present disclosure. A color filter substrate (corresponding to the first substrate 21 in FIG. 9) in the embodiment of the present disclosure is manufactured using the method for manufacturing the substrate comprising the quantum rod film. In the embodiment, the color filter layer 212 and the first polarizing plate 24 in a color filter substrate in the prior art are replaced by the quantum rod film. The specific contents are shown in FIG. 10. In the present embodiment, the display panel comprises an upper substrate 31, a lower substrate 32 opposite to the upper substrate 31, a liquid crystal layer 33 arranged between the upper substrate 31 and the lower substrate 32, and a lower polarizing plate 34 arranged at a surface of the lower substrate 32 far away from the liquid crystal layer 33. In the present embodiment, the upper substrate 31 comprises a base 311 and a quantum rod film 312, manufactured according to the present disclosure, on the base.

The quantum rod film in the present disclosure can also be used in other types of display panels, for example, a color filter on array display panel. In the color filter on array display panel, a color filter layer is arranged on an array substrate. Thus, the color filter layer on the array substrate can be replaced by the quantum rod film in the present disclosure, and meanwhile a polarizing plate at a side of the array substrate does not need to be arranged. Those skilled in the art can make arrangements according to needs, and details are not described here to avoid redundancy.

The quantum rods, like quantum dots, emit lights when they are subjected to light irradiations, have a narrow semi-wave width of an emission spectrum, and have good temperature stability. In actual use, the quantum rods can emit lights of different wavelengths by adjusting the sizes of the quantum rod assemblies. Therefore, when the quantum rod film is used as the color filter layer, different areas of the display panel can be arranged to correspond to quantum rod assemblies of different sizes according to needs so as to function as the color filter layer. Adjusting the sizes of the quantum rods is achieved by arranging differences in the sizes of the quantum rod assemblies. Thus, when the quantum rod assemblies of different sizes are subjected to the light irradiations, the lights of different wavelengths are emitted from the quantum rod assemblies. A research shows that as a light-emitting material, the quantum dots can have a color gamut greater than 100% which is a standard provided by the National Television Standard Committee, compared with pigments or fluorescent powder. In the current market, the color gamut of a liquid crystal display panel is generally 70%. Thus, the color gamut of a liquid crystal display panel in the present embodiment is 30% higher than the color gamut of the liquid crystal display panel in the current market.

The present disclosure is described with reference to preferred embodiments. However, without departing from the spirit of the present disclosure, various improvements can be made, and equivalents can be used to replace components in the present disclosure. In particular, as long as there is no structural conflict, technical features in respective embodiments can be combined with one another in any manner. The present disclosure is not limited to the specific embodiments disclosed, but comprises all technical solutions that fall into the scope defined in the claims.

The invention claimed is:

1. A method for manufacturing a substrate comprising a quantum rod film, comprising following steps:
   S10: forming a first film on a first base;
   S20: treating the first film formed in S10 to form a plurality of first areas which are arranged with gaps therebetween and are strip-shape structures with micrometer-scale widths, wherein other areas on the first film are second areas, and the first areas and the second areas have opposite hydrophilicity and hydrophobicity;

S30: coating a solution comprising quantum rod assemblies onto the first film obtained in S20 to form a quantum rod sub-film, the quantum rod assemblies having same hydrophilicity and hydrophobicity as the first areas, having micrometer-scale sizes, and being arranged sequentially in the first areas;

S40: coating an adhesive on the quantum rod sub-film and attaching a second base to the adhesive;

S50: peeling off the first base and transferring a first quantum rod sub-film onto the second base; and S60: repeating S10 to S40 at least once on the first quantum rod sub-film to form at least two quantum rod sub-films on the second base;

wherein, the quantum rod film comprises all the quantum rod sub-films, orthographic projections of the first areas for making different quantum rod sub-films on the second base do not overlap, and all the orthographic projections of the first areas on the second base cover a surface of the second base entirely.

2. The method according to claim 1, wherein the plurality of the first areas is arranged in parallel.

3. The method according to claim 2, wherein in S30, the solution comprising the quantum rod assemblies is coated by spin coating, slot coating, or ink jet printing.

4. The method according to claim 1, wherein the first film is a hydrophilic film, the first areas are hydrophobic areas with widths in a range from 1 μm to 20 μm, and the quantum rod assemblies are hydrophobic with sizes in a range from 0.5 μm to 20 μm.

5. The method according to claim 4, wherein the plurality of the first areas is arranged in parallel.

6. The method according to claim 1, wherein the first film is a hydrophobic film, the first areas are hydrophilic areas with widths in a range from 1 μm to 20 μm, and the quantum rod assemblies are hydrophilic with sizes in a range from 0.5 μm to 20 μm.

7. The method according to claim 6, wherein the plurality of the first areas is arranged in parallel.

8. The method according to claim 6, wherein in S40, before the adhesive is coated, passivation is performed to the first areas with hexamethyldisilazane to enable hydroxyl in the first areas to be replaced by methyl.

9. The method according to claim 8, wherein the plurality of the first areas is arranged in parallel.

10. The method according to claim 6, wherein in S10, the first film is formed by polydimethylsiloxane, and in S20, an ultraviolet irradiation, an ozone treatment or a plasma treatment is performed to local areas of the first film to enable alkyl chain in treated areas to produce hydroxyl so as to form the first areas.

11. The method according to claim 10, wherein the plurality of the first areas is arranged in parallel.

12. The method according to claim 10, wherein before the adhesive is coated in S40, passivation is performed to the first areas with hexamethyldisilazane to enable hydroxyl in the first areas to be replaced by methyl.

13. The method according to claim 12, wherein the plurality of the first areas is arranged in parallel.

14. The method according to claim 13, wherein, in S30, the solution comprising the quantum rod assemblies is coated by spin coating, slot coating, or ink jet printing.

15. A substrate comprising a quantum rod film, wherein the substrate is manufactured according to a following method:

S10: forming a first film on a first base;

S20: treating the first film formed in S10 to form a plurality of first areas which are arranged with gaps therebetween and are strip-shape structures with micrometer-scale widths, wherein other areas on the first film are second areas, and the first areas and the second areas have opposite hydrophilicity and hydrophobicity;

S30: coating a solution comprising quantum rod assemblies onto the first film obtained in S20 to form a quantum rod sub-film, the quantum rod assemblies having same hydrophilicity and hydrophobicity as the first areas, having micrometer-scale sizes, and being arranged sequentially in the first areas;

S40: coating an adhesive on the quantum rod sub-film and attaching a second base to the adhesive;

S50: peeling off the first base and transferring a first quantum rod sub-film onto the second base; and S60: repeating S10 to S40 at least once on the first quantum rod sub-film to form at least two quantum rod sub-films on the second base;

wherein, the quantum rod film comprises all the quantum rod sub-films, orthographic projections of the first areas for making different quantum rod sub-films on the second base do not overlap, and all the orthographic projections of the first areas on the second base cover a surface of the second base entirely.

16. The substrate according to claim 15, wherein the substrate is a color filter substrate.

17. A display panel, which comprises:
a first substrate,
a second substrate opposite the first substrate, and
a liquid crystal layer arranged between the first substrate and the second substrate;

wherein the first substrate is a substrate comprising a quantum rod film, and a polarizing layer is arranged at a side of the second substrate far away from the liquid crystal layer; and the first substrate is manufactured according to a following method:

S10: forming a first film on a first base;

S20: treating the first film obtained in S10 to form a plurality of first areas which are arranged with gaps therebetween and are strip-shape structures with micrometer-scale widths, wherein other areas on the first film are second areas, and the first areas and the second areas have opposite hydrophilicity and hydrophobicity;

S30: coating a solution comprising quantum rod assemblies onto the first film obtained in S20 to form a quantum rod sub-film, the quantum rod assemblies having same hydrophilicity and hydrophobicity as the first areas, having micrometer-scale sizes, and being arranged sequentially in the first areas;

S40: coating an adhesive on the quantum rod sub-film and attaching a second base to the adhesive;

S50: peeling off the first base and transferring a first quantum rod sub-film onto the second base; and S60: repeating S10 to S40 at least once on the first quantum rod sub-film to form at least two quantum rod sub-films on the second base;

wherein, the quantum rod film comprises all the quantum rod sub-films, orthographic projections of the first areas for making different quantum rod sub-films on the second base do not overlap, and all the orthographic projections of the first areas on the second base cover a surface of the second base entirely.

18. The display panel according to claim 17, wherein the first substrate is a color filter substrate.

\* \* \* \* \*